United States Patent
Hein et al.

(10) Patent No.: US 9,440,477 B2
(45) Date of Patent: Sep. 13, 2016

(54) FLEXIBLE BOOK BINDING WITH INTERCHANGEABLE PAGES

(71) Applicant: Wuka, LLC, Saratoga Springs, UT (US)

(72) Inventors: Jeffrey S. Hein, Salt Lake City, UT (US); Matthew D. Hein, Saratoga Springs, UT (US); Lindy S. Shock, Salt Lake City, UT (US)

(73) Assignee: Wuka, LLC, Saratoga Springs, UT (US)

( * ) Notice: Subject to any disclaimer, the term of this patent is extended or adjusted under 35 U.S.C. 154(b) by 331 days.

(21) Appl. No.: 13/917,444

(22) Filed: Jun. 13, 2013

(65) Prior Publication Data
US 2013/0334806 A1 Dec. 19, 2013

Related U.S. Application Data

(60) Provisional application No. 61/658,915, filed on Jun. 13, 2012.

(51) Int. Cl.
| | |
|---|---|
| B42B 5/00 | (2006.01) |
| B42F 13/04 | (2006.01) |
| B42F 11/02 | (2006.01) |
| B42F 11/00 | (2006.01) |
| B42F 13/12 | (2006.01) |
| B42F 13/40 | (2006.01) |
| G09B 1/02 | (2006.01) |

(52) U.S. Cl.
CPC ............ *B42B 5/00* (2013.01); *B42F 11/00* (2013.01); *B42F 11/02* (2013.01); *B42F 13/04* (2013.01); *B42F 13/12* (2013.01); *B42F 13/40* (2013.01); *G09B 1/02* (2013.01)

(58) Field of Classification Search
CPC .......... B42D 11/00; B42D 11/02; B42F 3/04
USPC .............................. 281/45, 46, 47; 402/8, 13
See application file for complete search history.

(56) References Cited

U.S. PATENT DOCUMENTS

| | | | |
|---|---|---|---|
| 4,114,963 A | | 9/1978 | Menahem |
| 4,294,029 A | * | 10/1981 | Holson ................... B42F 11/00 40/388 |

FOREIGN PATENT DOCUMENTS

| | | | | |
|---|---|---|---|---|
| DE | 2318394 | * | 11/1973 | ............. B42F 11/00 |
| DE | 3815767 | * | 11/1989 | ............... B42F 1/00 |
| EP | 1769939 | * | 4/2007 | |
| FR | 2064616 | | 7/1971 | |
| FR | 2861329 | | 4/2005 | |

(Continued)

OTHER PUBLICATIONS

Application No. PCT/US2013/045679, 3104.2.1PCT, International Preliminary Report on Patentability, Dec. 24, 2014.
Application No. PCT/US2013/045679, 31042.1pct, International Search Report and Written Opinion, Sep. 12, 2013.

(Continued)

*Primary Examiner* — Kyle Grabowski
(74) *Attorney, Agent, or Firm* — Kunzler Law Group, PC

(57) ABSTRACT

Systems, apparatuses, and methods for a flexible book binding with interchangeable pages are presented. A plurality of elongate rods include tips disposed on ends of the elongate rods. A plurality of flexible, elongate link members includes one or more openings disposed in the elongate link members. The one or more openings are formed to receive the tips of the elongate rods. A plurality of pages includes rod couplers disposed along edges of the plurality of pages. The rod couplers are formed to receive the elongate rods.

20 Claims, 9 Drawing Sheets

(56) References Cited

FOREIGN PATENT DOCUMENTS

| GB | 892653 | * | 3/1962 |
| GB | 2075920 | | 11/1981 |
| GB | 2323815 | * | 4/1997 |

OTHER PUBLICATIONS

Application No. 13804920.0, 3104.2.1EP, Search Report, Dec. 21, 2015.

* cited by examiner

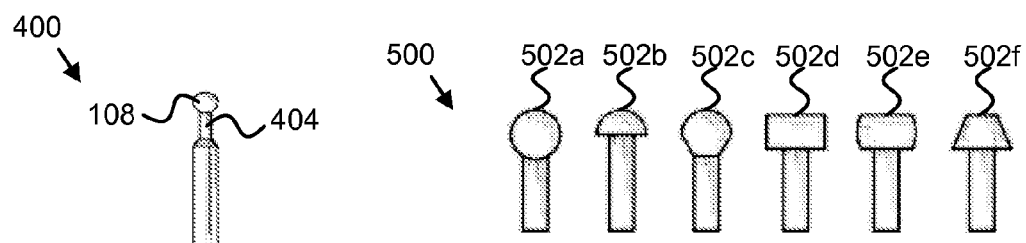
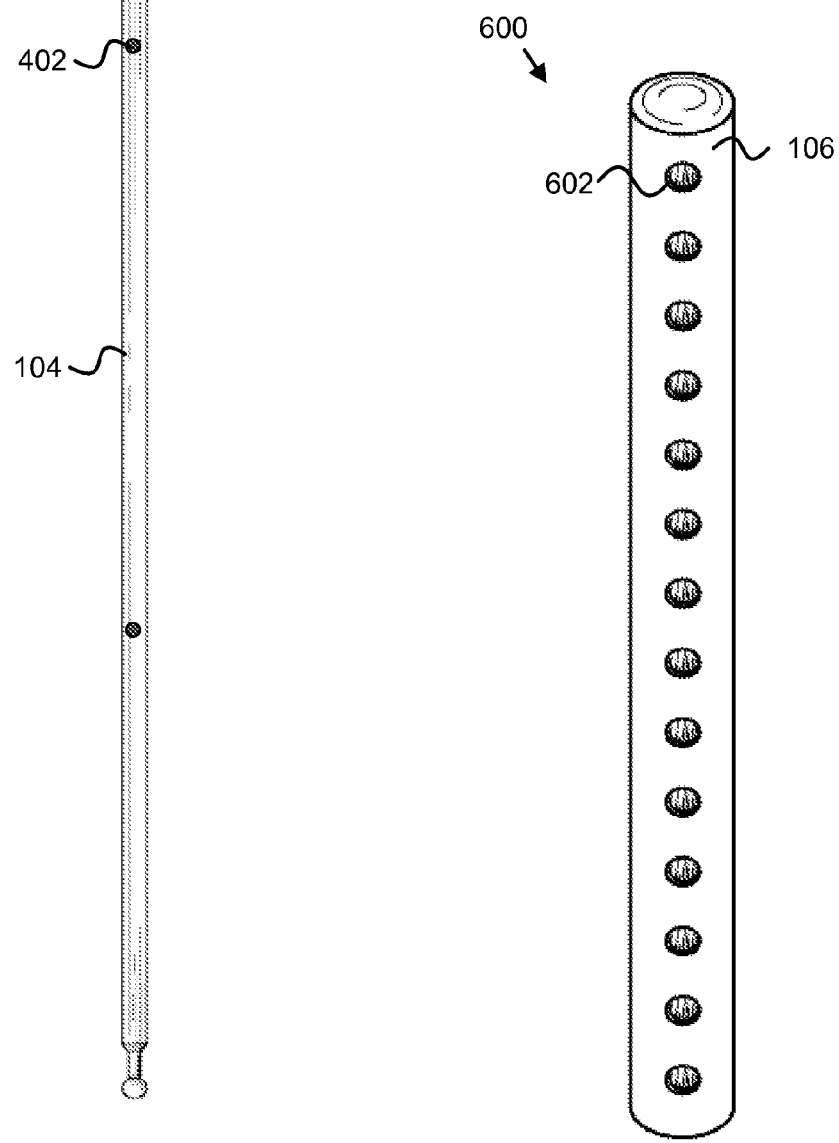
FIG. 5
FIG. 4  FIG. 6

FLEXIBLE BOOK BINDING WITH INTERCHANGEABLE PAGES

CROSS-REFERENCES TO RELATED APPLICATIONS

This application claims the benefit of U.S. Provisional Patent Application No. 61/658,915 entitled "Flexible Binding/Interchangeable Interactive Pages" and filed on Jun. 13, 2012, for Matthew D. Hein et al., which is incorporated herein by reference.

FIELD

This invention relates to book bindings and more particularly relates to a flexible book binding with interchangeable pages.

BACKGROUND

Books generally include of a collection of pages that may be bound together to hinge at one side. Typically, the pages of a book are permanently bound together using glue, stitching, or other fixed methods of book binding. Having a book with permanently bound pages may not be desirable, however, because pages cannot be added, removed, or interchanged without damage or substantial modification to the book, preventing any substantial customization of the book.

Binders may be used so that pages may be added to or removed from a collection of pages. Traditional binders, such as three-ring binders, typically include page retainers that are spring-loaded, like the rings in a three-ring binder. These binders, however, may be cumbersome, unattractive, and potentially unsafe to use due to the spring-loaded page retainers. Children may especially have a difficult time using a traditional binder as it may be difficult to open the spring-loaded retainers, or the retainers may pinch a child's fingers. Moreover, the spring-loaded page retainers may make a loud noise when being opened and closed.

SUMMARY

From the foregoing discussion, it should be apparent that a need exists for a system, apparatus, and method for a flexible book binding with interchangeable pages. Beneficially, such a system, apparatus, and method would be flexible, safe, quiet, and easily modifiable.

The subject matter of the present application has been developed in response to the present state of the art, and in particular, in response to the problems and needs in the art that have not yet been fully solved by currently available book binding systems. Accordingly, the present disclosure has been developed to provide a flexible book binding with interchangeable pages that overcomes many or all of the above-discussed shortcomings in the art.

Systems for a flexible book binding with interchangeable pages are presented. In one embodiment, a plurality of elongate rods include tips disposed on ends of the elongate rods. In another embodiment, a plurality of flexible, elongate link members include one or more openings disposed in the elongate link members. In some embodiments, the one or more openings are formed to receive the tips of the elongate rods. In another embodiment, a plurality of pages include rod couplers disposed along edges of the plurality of pages. The rod couplers, in certain embodiments, are formed to receive the elongate rods.

In one embodiment, a width of the tips is greater than a width of the one or more openings so that the elongate link members selectively couple the elongate rods in response to the one or more openings receiving the tips of the elongate rods. In another embodiment, the elongate rods are disposed between the elongate link members such that the rod couplers of the pages are coupled to the elongate rods such that the elongate rods are selectively coupled at each end to at least one of the elongate link members.

In one embodiment, the tips of the elongate rods include different shapes and sizes and the one or more openings comprise matching shapes and sizes configured to receive the tips. In another embodiment, the rod couplers include sleeves disposed along the edges of the pages. The sleeves, in some embodiments, include one or more openings formed to receive the elongate rods.

In one embodiment, the pages include a children's activity page, a scrapbook page, and/or a photo album page and are interchangeably bindable by the elongate link members. In another embodiment, the children's activity page includes one or more learning activities performed by physically interacting with one or more interactive objects disposed on the children's activity page.

In one embodiment, the pages include one or more pockets formed to store one or more interactive objects associated with at least one of the pages. In another embodiment, the one or more pockets are selectively fastenable to secure the one or more interactive objects within the pocket. In a further embodiment, the pages include a case that includes one or more of a front page of the plurality of pages, a back page of the plurality of pages, a carrying handle, and a lock mechanism selectively securing the pages together.

Apparatuses for a flexible book binding with interchangeable pages are presented. In one embodiment, an elongate rod includes tips disposed on ends of the elongate rod. In another embodiment, the tips are shaped to releasably interface with openings disposed in one or more flexible, elongate link members. In some embodiments, a rod coupler is formed to receive the elongate rod and a page that includes the rod coupler. In other embodiments, the rod coupler is disposed along an edge of the page.

In one embodiment, the rod coupler is formed to receive elongate rods that have different sizes, such as a different length and different width. In some embodiments, the size of the elongate rod being determined by the size of the rod coupler. In certain embodiments, the rod coupler includes a sleeve disposed along the edge of the page that includes one or more openings formed to receive the elongate rod.

In one embodiment, the rod coupler includes one or more tying members and the elongate rod comprises one or more openings disposed in the elongate rod. In another embodiment, the one or more openings are formed to receive the tying members to fasten the elongate rod to the page. In a further embodiment, the elongate rod includes a slot disposed along a length of the elongate rod that is formed to receive the rod coupler and operatively connect the rod coupler to the elongate rod such that the page is coupled to the elongate rod. In another embodiment, the elongate rod opens along its length to receive the rod coupler and closes down on the rod coupler to fasten the rod coupler in place such that the page is coupled to the elongate rod.

Methods for a flexible book binding with interchangeable pages are presented. In one embodiment, a method includes selecting one or more pages from a plurality of available page. In another embodiment, the one or more pages include a rod coupler disposed along an edge of the page. The method, in a further embodiment, includes coupling an elongate rod to the rod coupler. In certain embodiments, the elongate rod includes tips disposed on ends of the elongate rod. In one embodiment, the method includes inserting the tips of the elongate rod into openings disposed in one or more flexible, elongate link members. The one or more elongate link members, in one embodiment, include one or more openings arranged along a length of the one or more elongate link members. In another embodiment, the one or more openings are formed to receive the tips of the elongate rod.

In one embodiment, the one or more pages are selected based on user input. In another embodiment, a user selects one or more pages from a plurality of pages presented to the user using a data network. In a further embodiment, the method includes adding a customized name and/or message to a page. In certain embodiments, a customized name and/or message is specified by a user using a data network.

In one embodiment, the method includes selecting a number of openings in the one or more elongate link members based on a number of pages selected by a user. In another embodiment, the method includes selecting a size of the elongate rod from a plurality of available rod sizes wherein the sizes include one or more of a width and a length.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 4 is a perspective view of one embodiment of an elongate rod in accordance with the present subject matter;

FIG. 5 is a perspective view of various embodiments of tips disposed on an end of an elongate rod in accordance with the present subject matter;

FIG. 6 is a perspective view of one embodiment of an elongate link member in accordance with the present subject matter;

DETAILED DESCRIPTION

Figure 1:
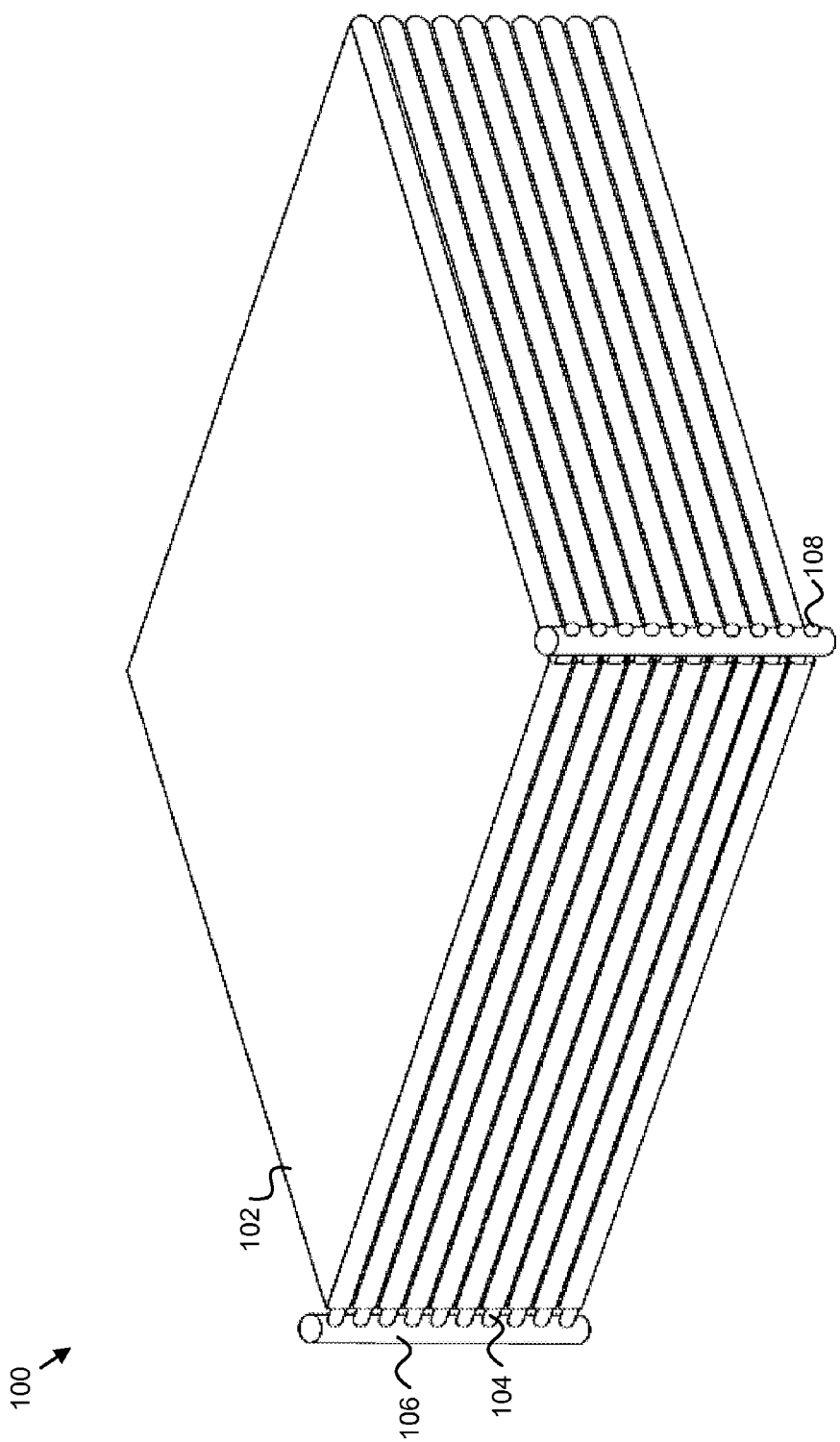
FIG. 1 is a perspective view of one embodiment of a system for a flexible book binding with interchangeable pages in accordance with the present subject matter.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model. The computer program product may be stored on a shared file system accessible from one or more servers.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1 is a perspective view of one embodiment of a system 100 for a flexible binding with interchangeable pages 102. The system 100, in one embodiment, includes a plurality of interchangeable pages 102, a plurality of elongate rods 104, and a plurality of elongate linking members 106. In certain embodiments, the interchangeable page 102 includes a front side, a back side, and at least one edge. The interchangeable page 102 may have a substantially rectangular shape. In other embodiments, the interchangeable page 102 is embodied in various shapes, such as a semi-circle, a half-triangle, the shape of an object (e.g., an animal, a building, a toy), or the like.

The interchangeable page 102, in one embodiment, includes a substantially flexible material. In one embodiment, the flexible material includes fabric that may include cotton, polyester, nylon, rayon, silk, wool, leather, or the like, or any combination thereof. In other embodiments, the flexible material includes various types of synthetic or semi-synthetic moldable materials such as plastic, nylon, rubber, or the like. In another embodiment, the interchangeable page 102 includes a layer of insulation, such as batting, between two layers of flexible material that are mechanically coupled together. The interchangeable page 102, in a further embodiment, may include paper, cardboard, or another paper-based material.

In one embodiment, the interchangeable page 102 includes one or more interactive elements. For example, the interchangeable page 102 may be a children's activity page 102 that includes different activities for helping children gain cognitive skills, physical skills, or the like. The activities may include activities involving reading, math, logic, or the like. In some embodiments, the interchangeable page 102 includes activities for helping children gain physical and/or creativity skills, such as drawing, painting, tracing, or the like. In other embodiments, the activities may include games that help children gain language skills, such as drawing letters of an alphabet, spelling words, constructing sentences, or the like. In a further embodiment, the interchangeable page 102 includes activities to help children gain social skills, such as playing games with one or more friends. In some embodiments, the interchangeable page 102 includes activities on both the front side and back side of the interchangeable page 102.

In one embodiment, the interchangeable page 102 includes one or more interactive objects associated with the page 102. In one embodiment, the interactive objects are mechanically connected to the interchangeable page 102. For example, the interactive objects may be tied to the interchangeable page 102 using a string, thread, cord, chain, or the like. In another embodiment, the interactive objects are loose without being mechanically connected to the interchangeable page 102. The interactive objects, in a further embodiment, may be associated with one or more activities associated with a children's activity page 102. For example, the interchangeable page 102 may include a matching game where a child matches an object, such as a square item, to a corresponding area of the interchangeable page 102 that includes a matching outline of the object, such as the square item. The one or more interactive objects may selectively attach to the interchangeable page 102 using an attachment element, such as a hook-and-loop system (e.g., Velcro®), buttons, snaps, cords, a pocket, an opening, or the like.

In some embodiments, the interchangeable page 102 may include one or more pockets to store the one or more interactive objects. A pocket may selectively fasten to secure the one or more pieces within the pocket. For example, a pocket may selectively fasten with a zipper, a hook-and-loop system (e.g., Velcro®), buttons, snaps, cords, or the like. In another embodiment, a pocket itself selectively attaches to the interchangeable page 102 using a fastener, such as a hook-and-loop fastener. The pocket may then be placed in different places on the page 102 according to preferences of the user.

In other embodiments, the interchangeable page 102 includes substantially rigid material. For example, the interchangeable page 102 may be embodied as a scrapbooking page 102 or a photo album page 102 where it would be desirable for the page 102 to retain its shape and not be flexible. In one embodiment, the rigid material may include heavy-duty paper, such as cardboard, card stock, corrugated fiberboard, paperboard, or the like. The rigid material, in some embodiments, includes various thermoset plastics and/or thermoplastics.

In another embodiment, the interchangeable page 102 includes a page protector. In one embodiment, the page protector includes flexible material, such as clear plastic, that receives another page 102 in an opening on an edge of the page protector. For example, the page protector may be a plastic sleeve that is formed to receive one or more interchangeable pages 102 through an opening on the top edge. In another embodiment, the page protector includes a flap that covers the opening on the edge of the page protector. Beneficially, the page protector may provide another way to easily interchange pages 102 and protect pages 102 from being damaged.

The elongate rod 104, in one embodiment, is coupled to the interchangeable page 102 using a rod coupler 302 disposed along an edge of the interchangeable page 102, as described below with reference to FIG. 3. In another embodiment, the elongate rod 104, includes a substantially rigid material. The rigid material may include metals such as aluminum, steel, stainless steel, or the like. In other embodiments, the rigid material may include a heavy-duty plastic, ceramic, glass, or the like. In some embodiments, the elongate rod 104 has a substantially cylindrical shape. In other embodiments, the elongate rod 104 has a square shape, a triangular shape, or the like.

The elongate rod 104 may include a tip 108 disposed on each end. The tip 108 may include different shapes, such as tips 502a-502f illustrated in FIG. 5 and described below. For example, the tip 108 may have a spherical, conical, rectangular, or like shape. The tips 108 may also be embodied in different sizes, breadths, thicknesses, diameters, or the like to accommodate different sizes of elongate link members 106. In other embodiments, the elongate rods 104 may have different sizes, including different widths, different lengths, or the like, for books of different sizes. In one embodiment, the size of the elongate rod 104 is based on the size of the rod coupler 302 disposed along an edge of the interchangeable page 102 (e.g., a size of the pages 102, a size of the book, or the like), as described with reference to FIG. 3 below. The elongate rod 104 is described in more detail below with reference to FIG. 4.

The elongate link member 106, in one embodiment, receives the tips 108 of the elongate rods 104 and removably couples the elongate rods 104 to the elongate link members 106, which, in turn, selectively binds the interchangeable pages 102 together and forms a flexible book that may be modified or customized as desired. In certain embodiments, the elongate rod 104, with an associated interchangeable page 102, may permanently couple to the elongate link member 106 in order to provide a flexible fixed book binding (e.g., with glue, by melting or fusing the link member 106 to the rods 104, or the like).

The elongate link member 106, in one embodiment, includes a substantially flexible body. The flexible body may include a flexible synthetic material, such as silicone, rubber, or the like, and may include different colors, different shapes, printed or molded lettering, or the like. In other embodiments, the elongate link member 106 may include a substantially rigid body, with flexible material just for the openings or the like, to provide additional support and structure to the book. The elongate link member 106 is described below in more detail with reference to FIG. 6.

In the depicted embodiment, the elongate rods 104 have a parallel orientation relative to the interchangeable pages 102 and are removably coupled to elongate link members 106, which have a perpendicular orientation relative to the elongate rods 104. In another embodiment, the elongate rods 104 may have a perpendicular orientation relative to the interchangeable pages 102, such that the elongate rods 104 extend through one or more interchangeable pages 102 and are removably coupled to elongate link members 106, which may have a parallel orientation relative to the interchangeable pages 102, being disposed along an edge of front and back pages 102, or the like.

Figure 2:
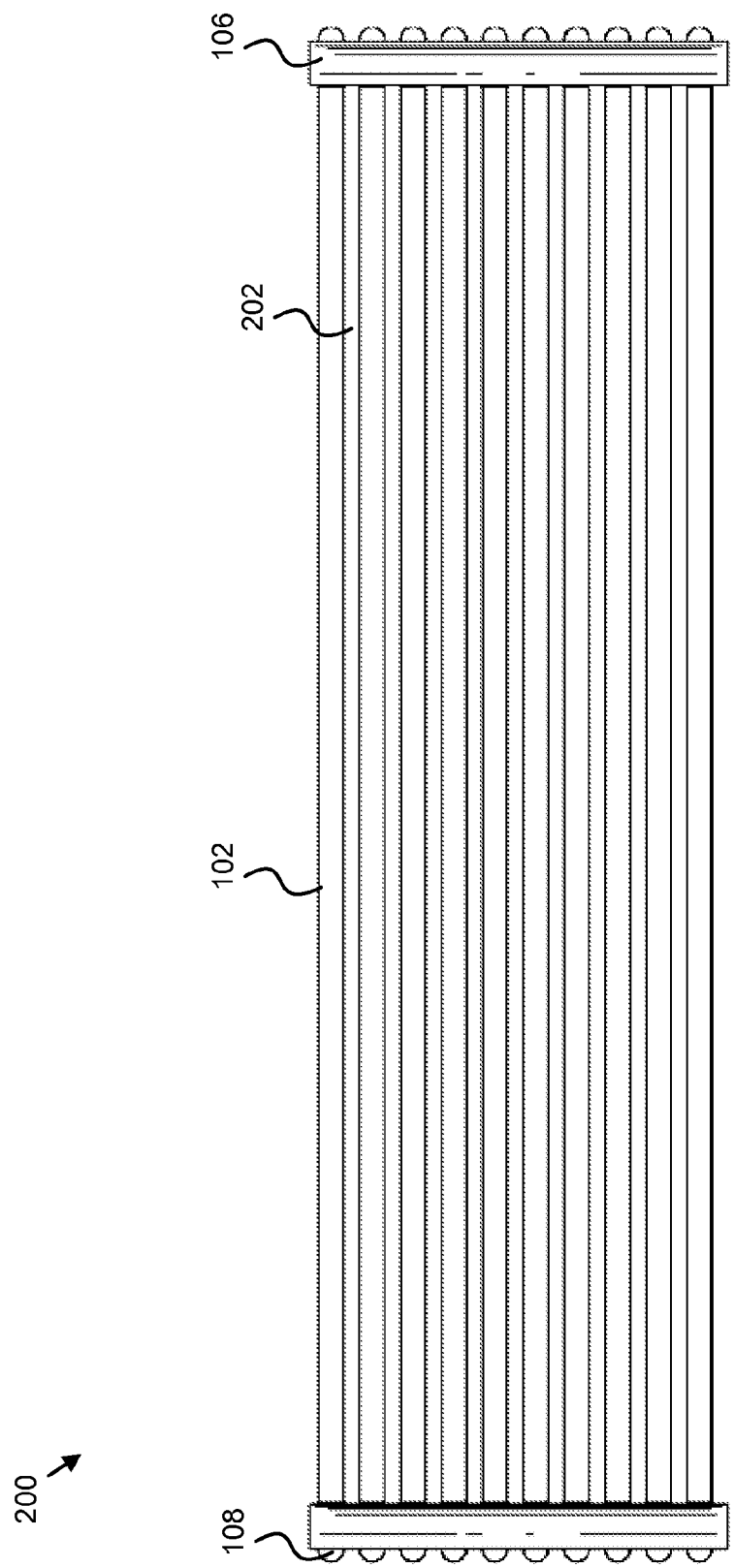
FIG. 2 is a side view of one embodiment of a system for a flexible book binding with interchangeable pages in accordance with the present subject matter.

FIG. 2 is a side view of one embodiment of a system 200 for a flexible book binding with interchangeable pages 102. Similar to FIG. 1, FIG. 2 illustrates a closed book having a plurality of interchangeable pages 102 coupled to elongate rods 104. The elongate rods 104, in the depicted embodiment, include tips 108 that engage a plurality of elongate link members 106 and removably couple the elongate rods 104 to the elongate link members 106. In one embodiment, the tips 108 of the elongate rods 104 are removeably coupled to openings 602 disposed in the elongate link members 106, as described with reference to FIG. 6 below. In other embodiments, however, the elongate link members 106 may be removably coupled to any number of elongate rods 104, up to the number of openings 602 disposed in the elongate link members 106, or the like.

In one embodiment, the elongate rods 104 are removably coupled to the elongate link members 106 such that there are spaces 202 between two adjacent elongate rods 104 and the associated pages 102. In certain embodiments, interchangeable pages 102 may include a fastening member disposed along an edge that couples an interchangeable page 102 within the space 202 between adjacent elongate rods 104 (e.g., adjacent elongate rods 104 may pinch or lock a page 102 between the rods 104, instead of or in addition to coupling a page 102 directly to a rod 104). In some embodiments, the interchangeable page 102 may be coupled between adjacent elongate rods 104 without being coupled to the elongate link members 106.

Figure 3:
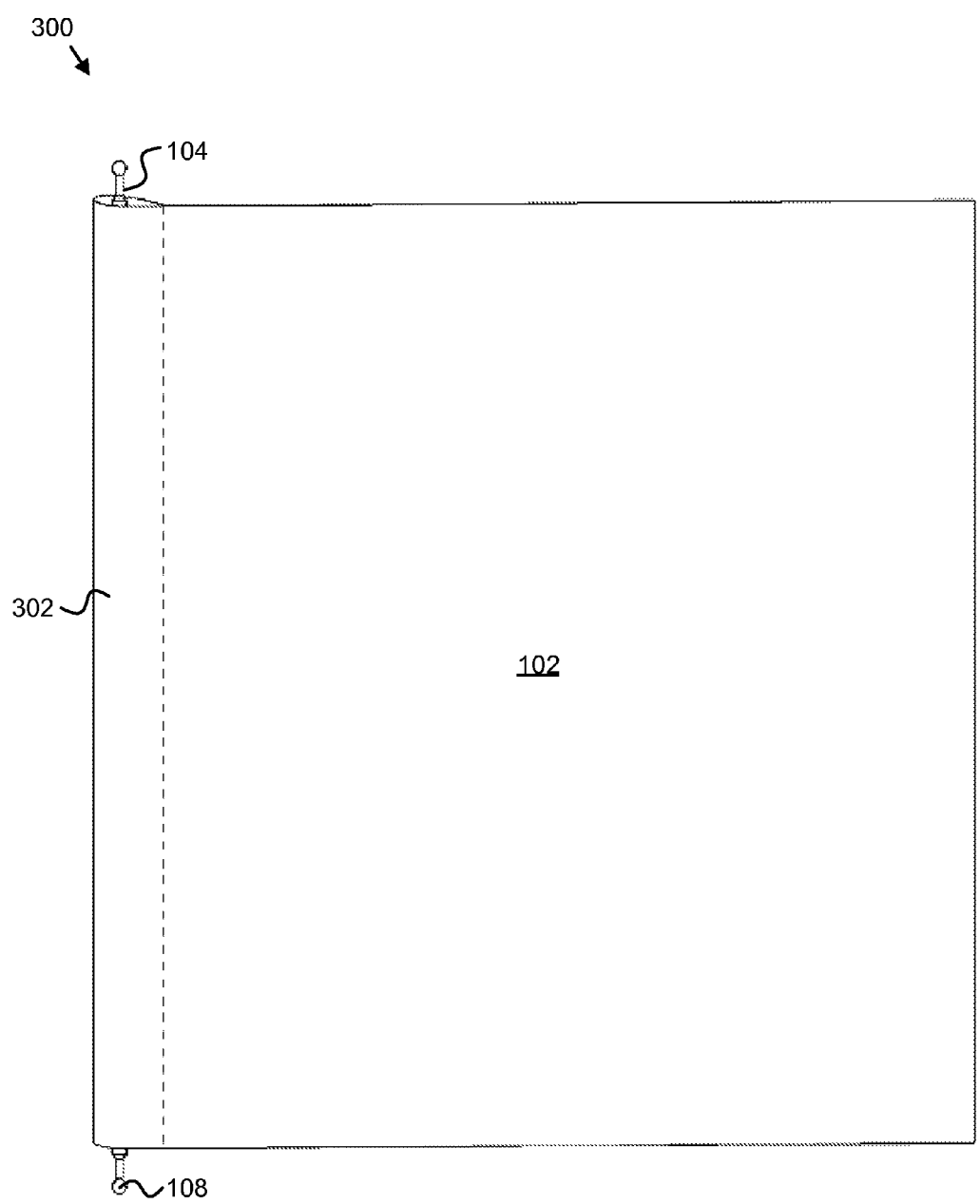
FIG. 3 is a perspective view of one embodiment of an interchangeable page in accordance with the present subject matter.

FIG. 3 is a perspective view of one embodiment 300 of an interchangeable page 102 with a rod coupler 302 disposed along one of its edges. The rod coupler 302, in one embodiment, is configured, shaped, or formed to receive the elongate rod 104. In certain embodiments, the rod coupler 302 includes a sleeve that is configured to substantially or partially cover the elongate rod 104 and couple the interchangeable page 102 to the elongate rod 104. In another embodiment, the rod coupler 302 includes one or more tying members configured to tie the elongate rod 104 to the interchangeable page 102 to couple the interchangeable page 102 to the elongate rod 104. In a further embodiment, the rod coupler 302 may include one or more loops or other openings configured, shaped, or formed to receive the elongate rod 104 and couple the elongate rod 104 to the interchangeable page 102.

In one embodiment, the elongate rod 104 may include a slot disposed along the length of the elongate rod 104 that is configured to receive the rod coupler 302. In such an embodiment, the rod coupler 302 is formed to be received in the slot on the elongate rod 104 such that the interchangeable page 102 is locked into the elongate rod 104 and selectively coupled to the elongate rod 104. For example, the rod coupler 302 may comprise a smaller rod, a stick, a T, or the like that slides into a slot or groove in the elongate rod 104 to couple the page 102 to the elongate rod 104. In another embodiment, the elongate rod 104 opens along its length to receive the rod coupler 302, with a hinge, a joint, a fold, or the like. In this embodiment, the elongate rod 104 may close down on the rod coupler 302 and lock the rod coupler 302 in position so that the interchangeable page 102 is selectively coupled to the elongate rod 104.

In certain embodiments, the elongate rod 104 is mechanically connected to the interchangeable page 102 such that the interchangeable page 102 is permanently coupled to the elongate rod 104. In some embodiments, the elongate rod 104 is sewn into the interchangeable page 102. In other embodiments, the elongate rod 104 is adhered to the interchangeable page 102 using an adhesive such as glue, cement, contact adhesives, or the like. In another embodiment, the elongate rod 104 is adhered to the interchangeable page 102 using a pressure sensitive adhesive. In another embodiment, the elongate rod 104 is adhered to the interchangeable page 102 using a hot-melt adhesive, such as hot glue. In certain embodiments, an interchangeable page 102 may be injection molded around an elongate rod 104, or may be formed of the same material and integrated with an elongate rod 104, or the like.

FIG. 4 is a perspective view of one embodiment 400 of an elongate rod 104. As described above, the elongate rod 104, in certain embodiments, includes a substantially rigid material, which provides structure and support to the book. The elongate rod 104 may also be embodied in various shapes, such as a cylindrical, square, triangular, or the like. The elongate rod 104, in other embodiments, may be formed with various lengths and widths to accommodate interchangeable pages 102 and associated books having different shapes and sizes.

In one embodiment, the elongate rod 104 is formed to couple to the interchangeable page 102 using a rod coupler 302 disposed along an edge of the interchangeable page 102. In certain embodiments, the elongate rod 104 includes one or more openings 402 disposed along its length that are configured to receive a tying member. The tying member, in some embodiments, is mechanically connected to the interchangeable page 102 and couples the elongate rod 104 to the interchangeable page 102. For example, a tying member may include a string, a cord, a thread, a wire, or the like, that may be received through an opening 402 disposed on the elongate rod 104 to removeably or permanently fasten an interchangeable page 102 to the elongate rod 104. In other embodiments, the tying member is an element of the rod coupler 302 and may be used to help secure the interchangeable page 102 to the elongate rod 104.

In another embodiment, the elongate rod 104 includes a beveled portion 404 between the body of the elongate rod 104 and the tip 108 disposed on the end of the elongate rod 104. The beveled portion 404, in one embodiment, sits in an opening 602, as described below with regard to FIG. 6, disposed on the elongate link member 106 to secure the elongate rod 104 to the elongate link member 106. Additionally, the beveled portion 404 may allow the elongate rod 104 to move freely as the interchangeable pages 102 are turned, while the tip 108 of the elongate rod 104 maintains the coupling between the elongate rod 104 and the elongate link member 106.

FIG. 5 is a perspective view of various embodiments of tips 502a-f disposed on an end of elongate rods 104. The elongate rods 104 may include a tip 502 disposed on each end. A tip 502, in various embodiments, may be formed with different shapes, such as the different tips 502a-f. For example, the tip 502a is spherical, the tip 502b includes a half-sphere, the tip 502c includes a beveled sphere, the tip 502d is rectangular, the tip 502e is rectangular with rounded edges, the tip 502f is substantially conical, and the like. The tips 502 may also be embodied in different sizes, breadths, thicknesses, diameters, or the like to accommodate different sizes of elongate link members 106, different sized openings 602 in elongate link members as described below, or the like. For example, in certain embodiments, the openings 602 in an elongate link member 106 may be shaped to match and receive only certain tips 502a-f with a corresponding shape (e.g., circular, square, triangular, rectangular) and pages 102 may be pre-assigned an order based on the shapes of the openings 602 and the tips 502a-f, or the like.

FIG. 6 is a perspective view of one embodiment 600 of an elongate link member 106. The elongate link member 106 may be formed with various sizes, including having different lengths and/or widths. In some embodiments, the size of the elongate link member 106 depends on the number of interchangeable pages 102 being bound together. The size or length of an elongate link member 106, in certain embodiments, may be customizable. For example, an end-user, a book assembler, or the like may cut an elongate link member 106 so that it has only a number of openings 602 for a selected number of interchangeable changes 102, or the like.

In other embodiments, the size of the elongate link member 106 depends on the size of the elongate rods 104 being used in the book binding. For example, elongate rods 104 having larger widths may need to be removably coupled to elongate link members 106 that also have a larger width, have larger openings 602, or the like. In certain embodiments, the one or more openings 602 disposed in the elongate link member 106 have a width that is smaller than the width of the tips 108 of the elongate rods 104, which removably couples the elongate rod 104 to the elongate link member 106.

In one embodiment, the elongate link member 106 includes one or more openings 602 disposed in the elongate link members 106. The one or more openings 602 may be formed to receive the tips 108 of the elongate rods 104 and removably couple the elongate rods 104 to the elongate link members 106. In certain embodiments, the one or more openings 602 are linearly arranged along the length of the flexible body of the elongate link members 106. In other embodiments, the one or more openings 602 may be staggered along the length of the flexible body of the elongate link members 106.

In certain embodiments, the openings 602 comprise holes that extend through the width of the elongate link member 106, from one side of the elongate link member 106 to the opposite side of the elongate link member 106. In other embodiments, the openings 602 may not extend through the other side of the elongate link member 106, but may create a pocket or recess formed to receive a tip 108 of the elongate rod 104 and removably couple the elongate rod 104 to the elongate link member 106. The one or more openings 602, in some embodiments, are mechanically formed in the elongate link members 106. For example, the one or more openings 602 may be formed using a drill, a saw, a knife, a laser, or the like. In other embodiments, the one or more openings 602 are formed in the elongate link member 106 by being molded into the flexible body. For example, the one or more openings 602 may be part of the mold used to form a silicone elongate link member 106.

In certain embodiments, the openings 602 disposed in the elongate link members 106 may receive the tips 108 of the elongate rods 104 in any order, may be compatible with any tip 108, or the like. For example, an elongate rod 104 may engage the elongate link members 106 on the first opening 602, followed by another elongate rod 104 that engages the elongate link members 106 on the third opening 602. Beneficially, this may allow the interchangeable pages 102 to be installed in the binding in any order as desired by the user. In one embodiment, the openings 602 may be shaped to match and receive only certain tips 108, 502 with a corresponding shape (e.g., circular, square, triangular, rectangular) and pages 102 may be pre-assigned an order based on the shapes of the openings 602 and the tips 108, 502.

In some embodiments, the interchangeable pages 102 include a case. A case may include a front page 102, a back page 102, a carrying handle, and/or a lock mechanism that selectively secures the pages 102 together. The front page 102 and/or back page 102 may include a material, such as heavy-duty plastics, papers, metals, or the like, designed to protect the interchangeable pages 102 from damage caused by external conditions, such as liquids, sun, dirt, or the like. In other embodiments, the front and/or back page 102 (e.g., the case) may include decorative elements, such as pictures, drawings, ribbons, buttons, text, or the like. The front page 102 and/or back page 102 of the case may be an interchangeable page 102 that is coupled to an elongate rod 104 engaging elongate link members 106 as described above. One of the front page 102 and the back page 102 of a case may be longer than the other, and may extend or fold over interior pages 102 and couple or lock to the other one of the front page 102 and the back page 102 to secure the interior pages 102, using a lock mechanism such as a snap, a latch, a button, a loop, a hook, a hook-and-loop system (e.g., Velcro®), or the like.

In another embodiment, the lock mechanism may selectively secures the interchangeable pages 102 together. The lock mechanism may include a mechanical fastening device, such as a padlock, a cam lock, or the like, that is released by a physical object, such as a key. In other embodiments, the lock mechanism includes a mechanical device that is released by providing secret information, such as a combination lock that requires a correct sequence of numbers and/or symbols be used to open the lock. In some embodiments, the lock mechanism is released by providing a combination of a physical object and secret information. In another embodiment, the lock mechanism includes a mechanical fastener such as a latch, an elastic, a cord, a snap, a button, a cotter pin, or the like.

In one embodiment, the lock mechanism includes an electronic fastening device. The electronic fastening device, in certain embodiments, is released by providing a physical object, such as a fingerprint, security token, or the like. In other embodiments, the electronic fastening device is released by providing secret information such as a keycode or password. In another embodiment, the electronic fastening device is released by providing a combination of a physical object and secret information.

In other embodiments, the case or cover may include its own spine that couples the front page 102 and the back page 102 together without coupling the front page 102 and/or back page 102 to the flexible book binding. In such an embodiment, the bound interchangeable pages 102 may sit inside the case or cover between the front page 102 and the back page 102. In certain embodiments, the spine may include a carrying handle mechanically connected to the spine. In other embodiments, a handle may be removably coupled to the elongate link members 106 by the elongate rods 104. In such an embodiment, the ends of the handle include one or more openings that receive tips 108 of the elongate rods 104, which then engage the openings 602 disposed on the elongate link members 106 and couple the handle to the flexible book binding. The handle may include a flexible material similar to the elongate link members 106. In other embodiments, the handle includes a more rigid material than the elongate link members 106, such as plastic, leather, vinyl, metal, or the like.

In another embodiment, the elongate link members 106 may form a handle. For example, two elongate link members 106 may be operationally connected to each other by a handle. In certain embodiments, the handle is part of the mold that forms the elongate link members 106, such that the elongate link members 106 and the handle form one continuous object, with link member 106 portions on each end and a handle portion between the link member portions 106. In another embodiment, the handle may include a link portion on each end, such that the elongate rods 104 may selectively engage the handle. In other embodiments, the handle is mechanically connected to the elongate link members 106 using a fastening member, such as an adhesive, or the like.

Figure 7:
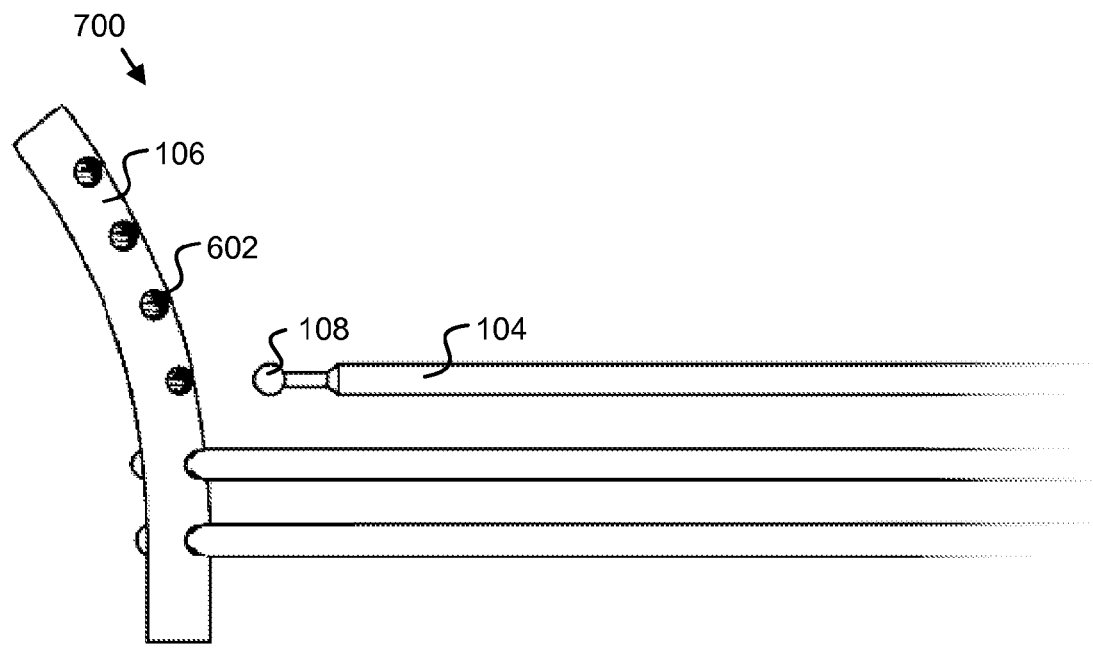
FIG. 7 is a perspective view of one embodiment of installing an elongate rod into an elongate link member in accordance with the present subject matter.

FIG. 7 is a perspective view of one embodiment 700 of installing an elongate rod 104 into an elongate link member 106. In one embodiment, the tips 108 of the elongate rods 104 engage the one or more openings 602 such that the tips 108 are received through the width of the elongate link members 106 and removably couple the elongate rods 104 to the elongate link members 106. In other embodiments, the openings 602 disposed in the elongate link members 106 do not extend through the width of the elongate link members 106 and the tips 108 also do not extend through the width of the elongate link members 106. Instead, the openings 602 form a pocket or recess in the elongate link members 106 such that the tips 108 of the elongate rods 104 are received in the opening 602 and couple the elongate rods 104 to the elongate link members 106.

In one embodiment, to assist in releasing a tip 108 from an elongate link member 106, the elongate link member 106 may be bent away from the elongate rods 104 to expand the opening 602 disposed on the opening of the elongate link member 106, which helps the elongate rod 104 selectively couple to or uncouple from the elongate link member 106. Advantageously, having flexible, elongate link members 106 may allow the elongate rods 104 to be easily and quickly installed and removed, which may allow the pages 102 to be interchangeable in the book binding without requiring major modification of the book or its binding.

Figure 8:
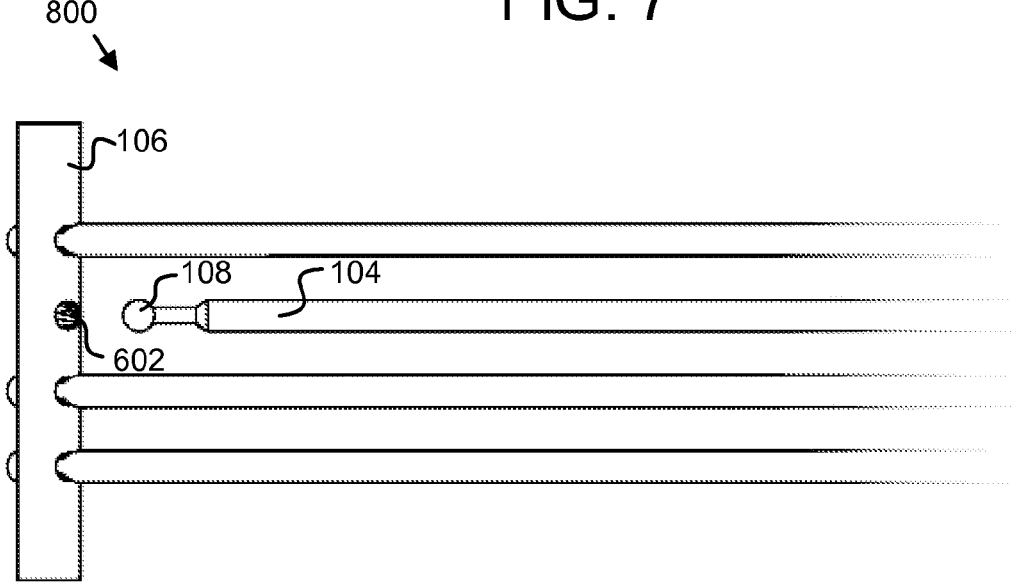
FIG. 8 is a perspective view of another embodiment of installing an elongate rod into an elongate link member in accordance with the present subject matter.

FIG. 8 is a perspective view of another embodiment 800 of installing an elongate rod 104 into an elongate link member 106. In one embodiment, an elongate rod 104 engages an opening 602 disposed in the elongate link member 106. The elongate rod 104, in this example, may be easily installed between other elongate rods 104 that are removably coupled to the elongate link member 106 without requiring the other elongate rods 104 to be removed or requiring other modifications to the book binding. In this manner, the interchangeable pages 102 coupled to the elongate rods 104 may be easily and quickly added and/or removed as desired by a user.

Figure 9:
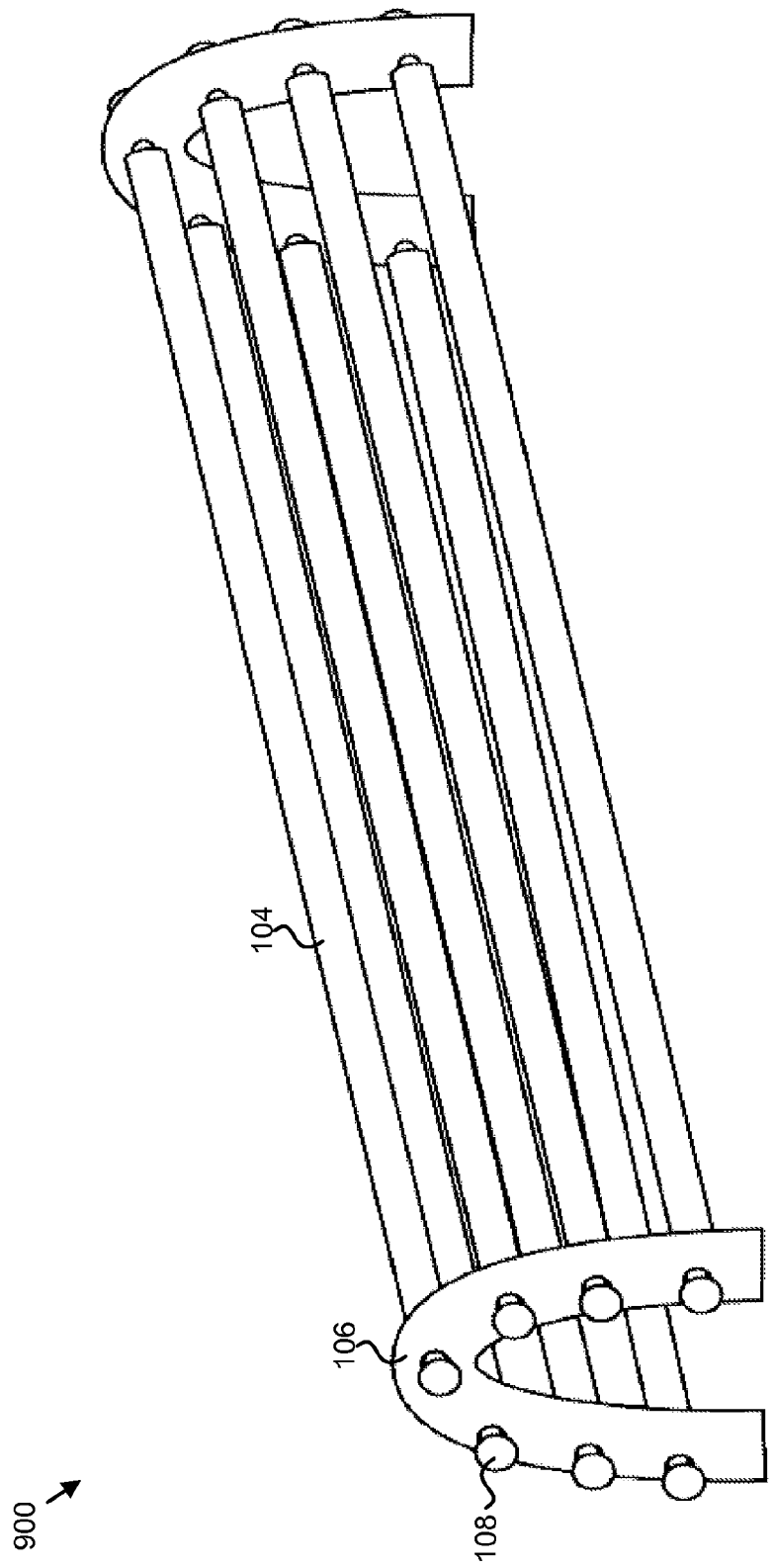
FIG. 9 is a perspective view of one embodiment of a plurality of elongate rods disposed between two elongate link members in accordance with the present subject matter.

FIG. 9 is a perspective view of one embodiment 900 of a plurality of elongate rods 104 disposed between two elongate link members 106. In one embodiment, the flexible, elongate link members 106 are flexible enough to allow the book to be bent or formed in various shapes as is needed by the user, such as allowing the interchangeable pages 102 to lay substantially flat on a surface. Beneficially, this may allow a user to easily use the book and interact with the interchangeable pages 102 without struggling to keep the book in an open position. In other embodiments, an elongate link member 106 may be formed in a curved or arced position as depicted.

Figure 10:
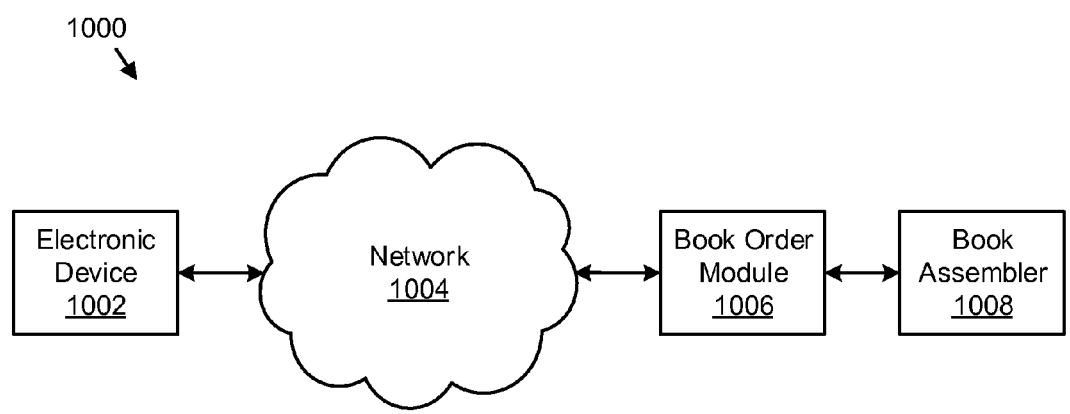
FIG. 10 is a schematic block diagram of one embodiment of a system for assembling a flexible book binding with interchangeable pages in accordance with the present subject matter.

FIG. 10 is a schematic block diagram of one embodiment of a system 1000 for assembling a flexible book binding with interchangeable pages 102. In one embodiment, the system 1000 includes an electronic device 1002, a digital data network 1004, a book order module 1006, and a book assembler 1006. In some embodiments, the electronic device 1002 may include a computing device with a processor and memory such as a laptop computer, desktop computer, smart phone, smart TV, tablet, mainframe, or the like. A user may use the electronic device 1002 to order a customized flexible book binding with interchangeable pages 102.

In one embodiment, a user selects one or more interchangeable pages 102 from a plurality of available interchangeable pages 102 (e.g., from different books, different sets, different themes, different stories). The available interchangeable pages 102 may be presented to the user on the electronic device 1002 using the digital data network 1004. In other embodiments, the pages 102 are presented to the user on a website, a mobile application, or the like. The user may also select the size of the interchangeable pages 102, which may determine the size of the elongate rods 104 used in the flexible book binding. In one embodiment, the size of the elongate link member 106 is determined by the number of interchangeable pages 102 selected by a user. Additionally, the user may also select a case, including the type of case, the design of the case, the type of handle, and the type of locking mechanism, customizations, if any.

The book order module 1006 may receive a user's selections over a data network 1004. The data network 1004, in certain embodiments, is a digital communication network 1004 that transmits digital communications related to an order for a flexible book binding with interchangeable pages 102. The digital communication network 1004 may include a wireless network, such as a wireless telephone network, a local wireless network, such as a Wi-Fi network, a Bluetooth® network, and the like. The digital communication network 1004 may include a wide area network ("WAN"), a storage area network ("SAN"), a local area network ("LAN"), an optical fiber network, the internet, or other digital communication network known in the art. The digital communication network 1004 may include two or more networks. The digital communication network 1004 may include one or more servers, routers, switches, and/or other networking equipment. The digital communication network 1004 may also include computer readable storage media, such as a hard disk drive, an optical drive, non-volatile memory, random access memory ("RAM"), or the like.

The book order module 1006, in one embodiment, is configured to receive orders for a flexible book binding with one or more interchangeable pages 102, thereby automating selection and customization of books for end-users, allowing the end-user to select which pages are included in a book, or the like. In certain embodiments, the book order module 1006 may be located on an electronic device, such as a laptop computer, desktop computer, server, blade center, smart phone, smart TV, tablet, mainframe, or the like. The book order module 1006 may ensure the order is correctly filled out with the appropriate and necessary information. If not filled out correctly, the book order module 1006 may alert the user that certain information is missing or is incorrect. In other embodiments, the book order module 1006 may queue the user's order if there is more than one order in a queue to be processed by the book assembler 1008.

In one embodiment, the book order module 1006 sends a user's order to the book assembler 1008. The book assembler 1008, in certain embodiments, assembles a flexible book binding with interchangeable pages 102 according to the specifications of the user in an order. In certain embodiments, the book assembler 1008 may include an automated book assembly machine that automatically processes the user's order and assembles the book with little to no manual input. In other embodiments, the book assembler 1008 may include manual processing and/or assembly. For example, the book assembler 1008 may automatically assemble the flexible book binding with interchangeable pages 102, e.g., the assembler 1008 may couple an interchangeable pages 102 to elongate rods 104, which are then removably coupled to the elongate link members 106, but a worker may attach a case, package the finished book, or the like. In another example, the book assembler 1008 may comprise a worker that may assemble or partially assemble the flexible book binding with interchangeable pages 102, including a case, packaging, or the like.

Figure 11:
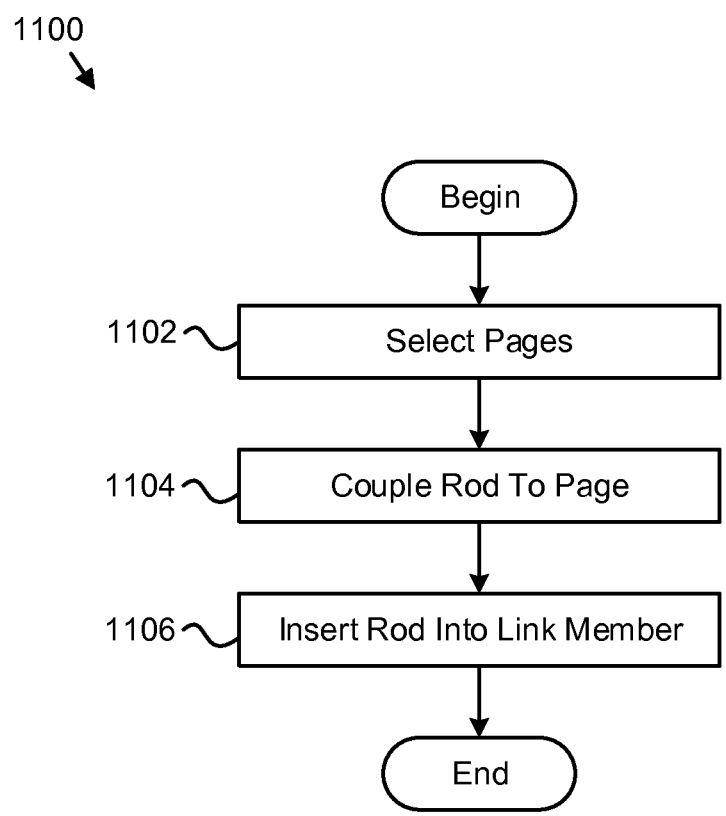
FIG. 11 is a schematic flow chart diagram of one embodiment of a method for assembling a flexible book binding with interchangeable pages in accordance with the present subject matter.

FIG. 11 is a schematic flow chart diagram of one embodiment of a method 1100 for assembling a flexible book binding with interchangeable pages 102. The method 1100 begins and the book order module 1006 selects 1102 one or more interchangeable pages 102 from a plurality of pages 102, in response to user input or the like. In some embodiments, the one or more interchangeable pages 102 include a rod coupler 302 disposed along an edge of the page 102. In one embodiment, the book assembler 1008 couples 1104 an elongate rod 104 to an interchangeable page 102. The elongate rod 104, in certain embodiments, includes tips 108 disposed on ends of the elongate rod 104.

The book assembler 1008, in another embodiment, inserts 1106 the tips 108 of the elongate rods 104 into openings 602 disposed in one or more flexible, elongate link members 106. In certain embodiments, the elongate link members 106 include one or more openings 602 arranged along a length of the one or more elongate link members 106. The one or more openings 602, in other embodiments, are formed to receive the tips 108 of the elongate rods 104 and the method 1100 ends.

Figure 12:
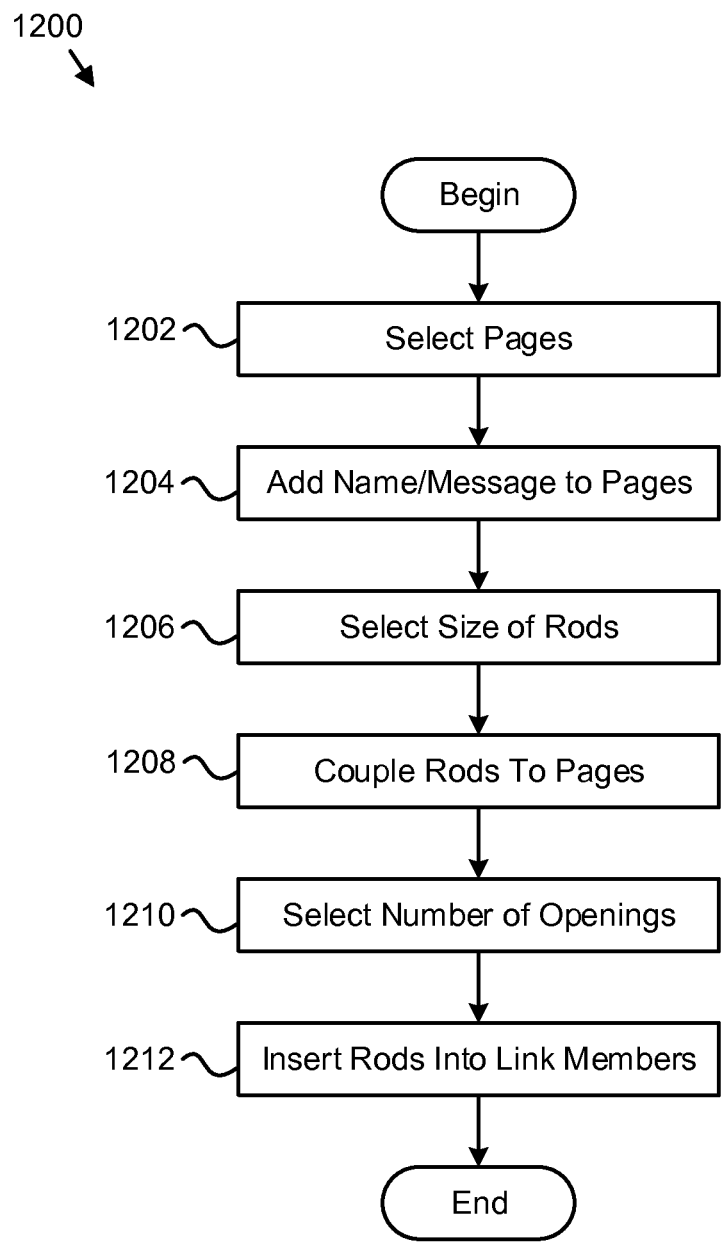
FIG. 12 is a schematic flow chart diagram of another embodiment of a method for assembling a flexible book binding with interchangeable pages in accordance with the present subject matter.

FIG. 12 is a schematic flow chart diagram of another embodiment of a method 1200 for assembling a flexible book binding with interchangeable pages 102. The method 1200 begins and the book order module 1006 selects 1202 one or more interchangeable pages 102 from a plurality of pages 102. In certain embodiments, the book order module 1006 selects the one or more interchangeable pages 102 in response to or based on a selection by a user using a data network 1004, such as a website, a mobile application, or the like. In other embodiments, the book assembler 1008 adds 1204 a name, message, picture, text, or other customization to the one or more interchangeable pages 102. In some embodiments, a user specifies a name, message, picture, text, or other customization using a data network 1004, such as a website, an application, or the like, in order to personalize the one or more interchangeable pages 102. The message may include a logo, quote, phrase, or the like as determined by a user. The user, in other embodiments, may select a message from one or more available messages presented to the user over the data network 1004.

In certain embodiments, the one or more interchangeable pages 102 include a rod coupler 302 disposed along an edge of the page 102, which is formed to receive an elongate rod 104. The book order module 1006, in one embodiment, selects 1206 a size of the elongate rod 104 from a plurality of available rod 104 sizes. In certain embodiments, the rod 104 sizes include a width and/or a length of the elongate rod 104. In some embodiments, the available rod 104 sizes depend on the size of the rod coupler 302 of the one or more selected interchangeable pages 102. In one embodiment, the user may select the size of the elongate rods 104 from a plurality of available rod 104 sizes presented using a data network 1004.

In one embodiment, the book assembler 1008 couples 1208 an elongate rod 104 to a rod coupler 302. In some embodiments, the elongate rod 104 includes tips 108 disposed on the ends of the elongate rods 104 that are formed to engage an opening 602 disposed on an elongate link member 106. In another embodiment, the book order module 1006 selects 1210 a number of openings 602 in one or more elongate link members 106. The number of openings 602, in some embodiments, depends on the number of pages 102 selected by a user. For example, if a user selects eight pages 102, the elongate link member 106 may only include eight openings 602 to accommodate the number of selected pages 102 and elongate rods 104. In other embodiments, the book order module 1006 selects 1210 more openings 602 than the number of selected pages 102. Beneficially, this may allow a user to add extra pages 102 in the future to the same book without selecting additional elongate link members 106.

The book assembler 1008, in one embodiment, inserts 1212 the tips 108 of the elongate rods 104 into the openings 602 disposed on the elongate link members 106. The openings 602, in certain embodiments, are formed to receive the tips 108 of the elongate rods 104. In other embodiments, the openings 602 are arranged along a length of the one or more elongate link members 106 and the method 1200 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for a flexible book binding with interchangeable pages, the system comprising:
   a plurality of elongate rods comprising tips disposed on ends of the elongate rods;
   a plurality of flexible, elongate link members comprising one or more openings disposed in the elongate link members, the one or more openings formed to receive the tips of the elongate rods at each end of the elongate rods, wherein each elongate link member has a rod-like shape such that the one or more openings are disposed along a length of each elongate link member; and
   a plurality of pages comprising rod couplers disposed along edges of the plurality of pages, the rod couplers formed to receive the elongate rods.

2. The system of claim 1, wherein a width of the tips is greater than a width of the one or more openings such that the elongate link members selectively couple the elongate rods in response to the one or more openings receiving the tips of the elongate rods.

3. The system of claim 1, wherein the elongate rods are disposed between the elongate link members such that the rod couplers of the pages are coupled to the elongate rods, the elongate rods being selectively coupled at each end to at least one of the elongate link members.

4. The system of claim 1, wherein the tips of the elongate rods comprise different shapes and sizes, and the one or more openings of each of the plurality of elongate link members have shapes and sizes that correspond to the shapes and sizes of the tips of the elongate rods.

5. The system of claim 1, wherein the rod couplers comprise sleeves disposed along the edges of the pages, the sleeves comprising one or more openings formed to receive the elongate rods.

6. The system of claim 1, wherein the pages comprise one or more of a children's activity page, a scrapbook page, and a photo album page, the pages being interchangeably bindable by the elongate link members.

7. The system of claim 6, wherein the children's activity page comprises one or more learning activities performed by physically interacting with one or more interactive objects disposed on the children's activity page.

8. The system of claim 1, wherein the pages comprise one or more pockets formed to store one or more interactive objects associated with at least one of the pages, the one or more pockets being selectively fastenable to secure the one or more interactive objects within the pocket.

9. The system of claim 1, wherein the pages comprise a case, the case comprising one or more of a front page of the plurality of pages, a back page of the plurality of pages, a carrying handle, and a lock mechanism selectively securing the pages together.

10. An apparatus for a flexible book binding with interchangeable pages, the apparatus comprising:
    an elongate rod comprising tips disposed on ends of the elongate rod, the tips shaped to releasably interface with openings disposed in one or more flexible, elongate link members, each elongate link member having a rod-like shape such that the one or more openings are disposed along a length of each elongate link member, the one or more openings formed to receive the tips of the elongate rod at each end of the elongate rod;
    a rod coupler formed to receive the elongate rod; and
    a page comprising the rod coupler, the rod coupler being disposed along an edge of the page.

11. The apparatus of claim 10, wherein the rod coupler is formed to receive different elongate rods each comprising a different size, the different sizes being one or more of a different width and a different length, a size of an elongate rod being determined by the size of the rod coupler.

12. The apparatus of claim 10, wherein the rod coupler comprises a sleeve disposed along the edge of the page, the sleeve comprising one or more openings formed to receive the elongate rod.

13. The apparatus of claim 10, wherein the rod coupler comprises one or more tying members and the elongate rod comprises one or more openings disposed in the elongate rod, the one or more openings formed to receive the tying members to fasten the elongate rod to the page.

14. The apparatus of claim 10, wherein the elongate rod comprises a slot disposed along a length of the elongate rod, the slot formed to receive the rod coupler and operatively connect the rod coupler to the elongate rod such that the page is coupled to the elongate rod.

15. The apparatus of claim 10, wherein the elongate rod opens along its length to receive the rod coupler, the elongate rod closing down on the rod coupler and fastening the rod coupler in place such that the page is coupled to the elongate rod.

16. A method for a flexible book binding with interchangeable pages, the method comprising:
    selecting one or more pages from a plurality of available pages, the one or more pages comprising a rod coupler disposed along an edge of the page;
    coupling an elongate rod to the rod coupler, the elongate rod comprising tips disposed on ends of the elongate rod; and
    inserting the tips of the elongate rod into openings disposed in one or more flexible, elongate link members, the one or more elongate link members having a rod-like shape and comprising one or more openings arranged along a length of the one or more elongate link members, the one or more openings formed to receive the tips of the elongate rod.

17. The method of claim 16, wherein the one or more pages are selected based on user input, a user selecting one or more pages from a plurality of pages presented to the user using a data network.

18. The method of claim 16, further comprising adding one or more of a customized name and message to a page, the one or more of a customized name and message being specified by a user using a data network.

19. The method of claim 16, further comprising selecting a number of openings in the one or more elongate link members based on a number of pages selected by a user.

20. The method of claim 16, further comprising selecting a size of the elongate rod from a plurality of available rod sizes, the rod sizes comprising one or more of a width and a length.

* * * * *